(12) United States Patent
DiGrazia

(10) Patent No.: US 6,513,861 B2
(45) Date of Patent: Feb. 4, 2003

(54) PROTECTIVE DEVICE FOR AN EDGE OF A GLASS OBJECT

(75) Inventor: Timothy W. DiGrazia, Naperville, IL (US)

(73) Assignee: Dura-Crafts Corporation, Frankfort, IL (US)

(*) Notice: Subject to any disclaimer, the term of this patent is extended or adjusted under 35 U.S.C. 154(b) by 0 days.

(21) Appl. No.: 09/930,928

(22) Filed: Aug. 16, 2001

(65) Prior Publication Data

US 2002/0074825 A1 Jun. 20, 2002

Related U.S. Application Data

(63) Continuation-in-part of application No. 09/640,618, filed on Aug. 17, 2000, now abandoned, which is a continuation-in-part of application No. 09/524,613, filed on Mar. 14, 2000, now abandoned.

(51) Int. Cl.[7] .................................................. B60J 9/00
(52) U.S. Cl. .......................................... 296/153; 49/462
(58) Field of Search ........................... 296/153; 49/462; 297/392

(56) References Cited

U.S. PATENT DOCUMENTS

| 91,389 A | 1/1869 | Weeden |
| 1,329,487 A | 2/1920 | West |
| 2,553,385 A | 5/1951 | Ruth .......................... 155/174 |
| 2,566,757 A | 9/1951 | Alexander ................... 155/174 |
| 2,617,679 A | 11/1952 | Maguire .................... 296/49.2 |
| 2,777,730 A | 1/1957 | Parshall ..................... 296/49.2 |
| 2,871,928 A | 2/1959 | Swenson .................... 155/198 |
| 2,983,310 A | 5/1961 | Warlick et al. ............. 155/174 |
| 3,029,107 A | 4/1962 | Myers ........................ 297/399 |
| 4,092,813 A | 6/1978 | Eggert ......................... 52/397 |
| 4,443,508 A | 4/1984 | Mehl .......................... 428/122 |
| 4,685,718 A | 8/1987 | Steenblik et al. ........... 296/154 |
| 4,860,689 A | 8/1989 | Stewart .......................... 119/1 |
| 5,048,892 A | 9/1991 | Ledbetter .................... 297/219 |
| 5,113,781 A | 5/1992 | Link ............................ 114/361 |
| D340,555 S | 10/1993 | Ott ............................. D30/144 |
| 5,700,053 A | 12/1997 | Downing .................... 297/227 |
| 5,934,754 A | 8/1999 | Raffa .......................... 297/392 |
| 6,000,365 A | 12/1999 | Charnesky .................. 119/712 |

OTHER PUBLICATIONS

The Orvis Guide to Outdoor Photography, Pfieffer, p. 172, 1986 (Century Publishing, Inc.).

Primary Examiner—D. Glenn Dayoan
Assistant Examiner—Lori L Coletta
(74) Attorney, Agent, or Firm—Marshall, Gerstein & Borun

(57) ABSTRACT

A protective device that can be placed on an edge of a glass object such as a vehicle window has a relatively flexible elongate cylindrical body. The body has an exterior surface terminating at a pair of opposed ends, a longitudinal axis, and a length between the opposed ends in a direction of the longitudinal axis. The body also has a glass receiving slot that extends between the opposed ends in the direction of the longitudinal axis. The slot has a pair of opposed and spaced apart slot walls that face one another. The slot also extends slightly helically around the elongate body between the opposed ends, requiring the protective device to twist slightly when installed on the edge of the glass object to thus help retain the device in place.

20 Claims, 4 Drawing Sheets

FIG. 2
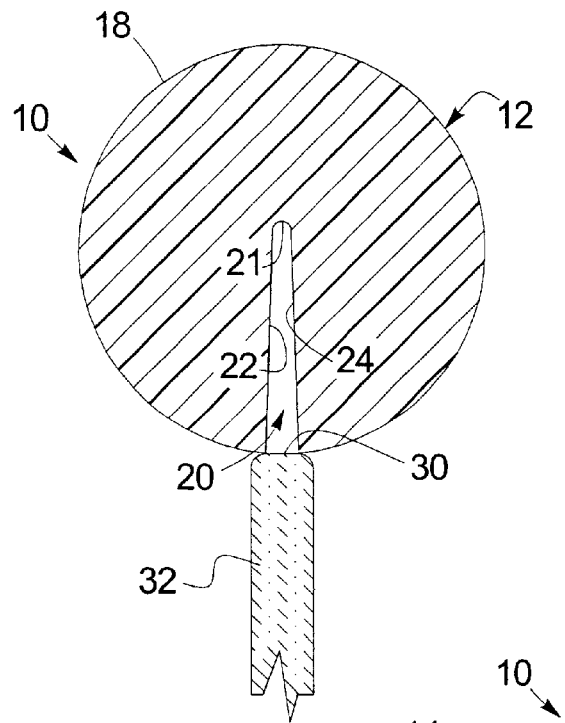
FIG. 3
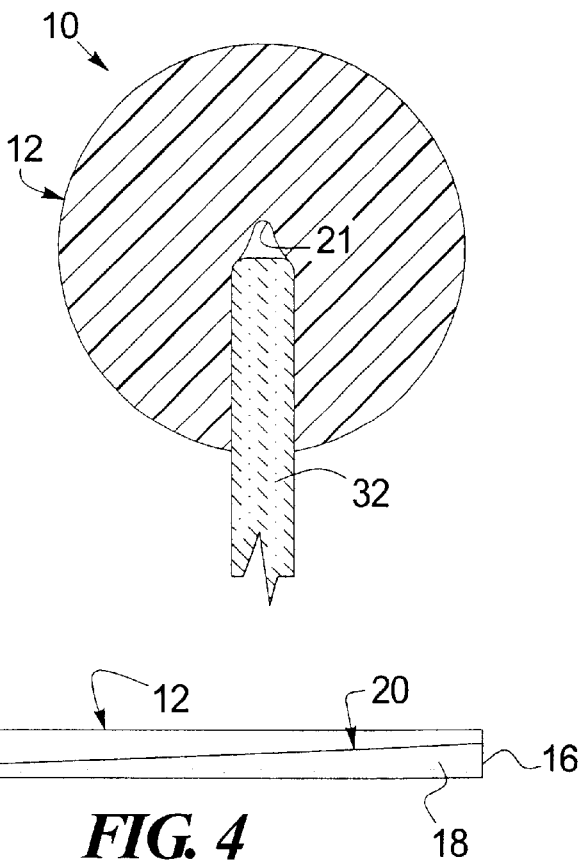
FIG. 4
FIG. 5A
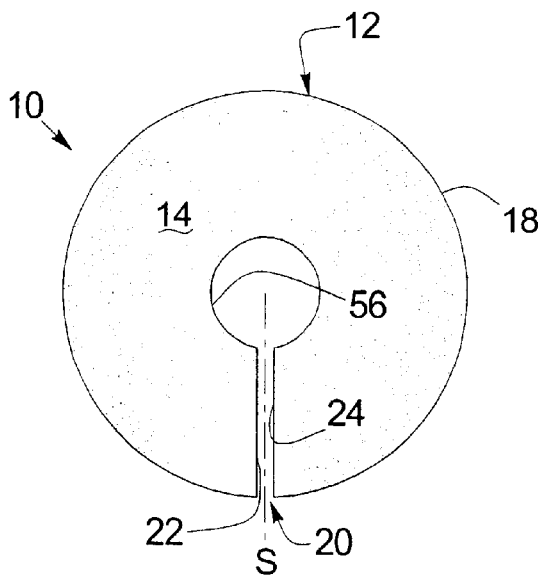
FIG. 5B
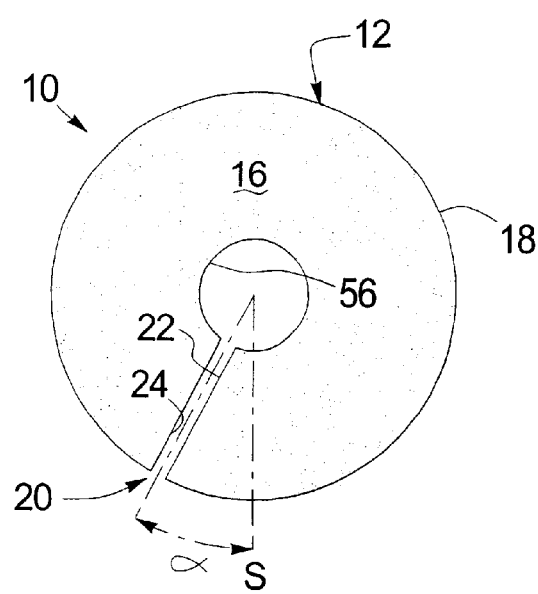

FIG. 6
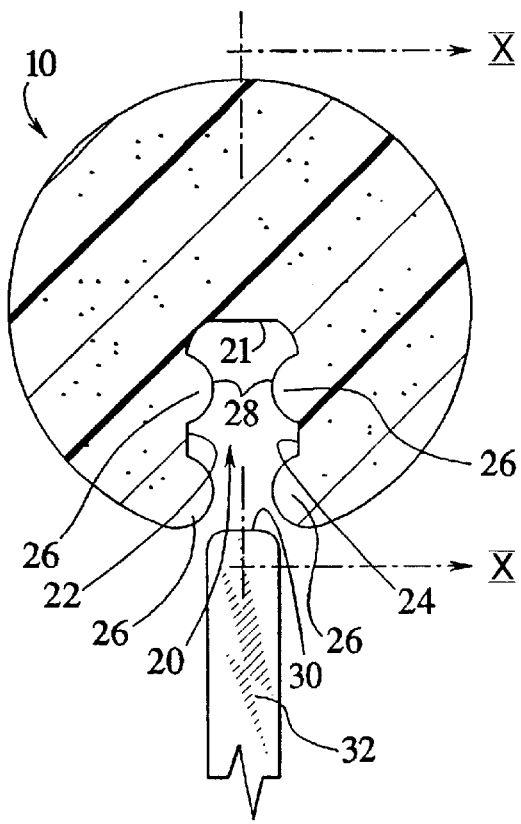
FIG. 7
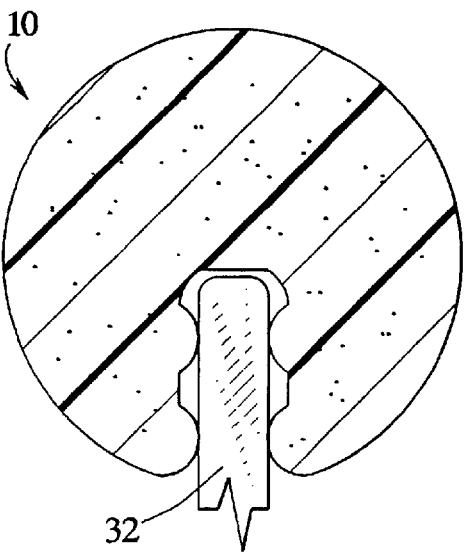
FIG. 8
FIG. 9

PROTECTIVE DEVICE FOR AN EDGE OF A GLASS OBJECT

RELATED APPLICATION DATA

This patent is a continuation-in-part of related U.S. patent application Ser. No. 09/640,618, which was filed on Aug. 17, 2000 now abandoned, and which is a continuation-in-part of related U.S. patent application Ser. No. 09/524,613, which was filed on Mar. 14, 2000, and which is now abandoned.

BACKGROUND OF THE INVENTION

1. Field of the Invention

The present invention relates generally to protective devices, and more particularly to a protective device for placement on an edge of a glass object such as a vehicle window when the window is partly lowered.

2. Description of the Related Art

Vehicles, such as automobiles, are often driven with the windows in a partly lowered position. In this position, the window edge is exposed and defines a space between the door frame of the vehicle and the window edge. It is common for animals riding in the vehicle as well as children and adults to extend a portion of their bodies such as their head or a limb out the partially opened window. Sometimes, the body part is rested directly against the edge of the window and other times the body part is simply held in the open space above the window edge.

As the vehicle is moving, it often encounters bumps or hazardous road conditions causing the vehicle to move in an upward or downward direction. This sudden movement can cause injury to the person or the animal extending a portion of their body through the opening between the window edge and the door frame. The body part can abruptly strike the window edge with significant force causing relatively severe injury to the body part. In one example, dogs riding in vehicles often like to place their heads out of an open window and when the vehicle strikes a bump, the dogs head slams against the window edge causing injury to the dog. The injury can be to the jaw bone or to the teeth of the dog and it is often quite severe.

Glass objects such as tables often have edges that are exposed. People and pets may bump into the table edge and suffer injury. This is a fairly common occurrence with young children. A child may fall and hit the table edge and suffer severe injury.

Raffa U.S. Pat. No. 5,934,754 discloses an automobile pet head rest that attaches to the top edge of a window. The device disclosed in Raffa is essentially linear in design for attachment to only the top relatively flat edge of the window. The device includes a dual-layer cushion with one layer telescopically received in the other. Between the two cushions are sandwiched a pair of clipping members which bias the U-shaped cushions toward one another closing the gap between two edges of a slot. The device also includes an outer shell protecting the inner layers. The device is received over the window edge along the top of the window and the clipping members tend to squeeze the glass within the slot between the edges.

The device disclosed in Raffa is fairly complex in construction and includes a number of discrete components including two cushion layers, a sheath, and a pair of clipping members. Additionally, the clipping members are fairly elaborate and would require significant separate tooling in order to manufacture the clips independent of the cushion layers. Also, the device is linear and is not intended to be bent over a curved portion of the window or other glass object. The device is simply intended as a pet head rest for installation on the top of a window edge.

SUMMARY OF THE INVENTION

One object of the present invention is to provide a protective device for installation on an edge of a partially opened vehicle window or on an edge of a glass object. Another object of the present invention is to provide such a protective device that is relatively simple and inexpensive to manufacture and install. Another object of the present invention is to provide such a protective device that can follow the contour of a curved edge of a glass object or a vehicle window when the window is partly opened and yet stay retained on the curved edge. A further object of the present invention is to provide such a protective device that requires fewer parts to manufacture and assemble in order to produce the finished product. A still further object of the present invention is to provide a relatively flexible protective device that can be easily removed and stored when not in use.

These and other objects features and advantages of the present invention are provided by a protective device constructed according to the teachings of the present invention. The protective device is intended for installation on an edge of a vehicle window or a glass object. In one example, the protective device has a relatively flexible elongate cylindrical body with an exterior surface terminating at a pair of opposed ends. The body also has a longitudinal axis and a length between the opposed ends in a direction of the longitudinal axis. The device has a glass object receiving slot formed in the body that extends between the opposed ends in the direction of the longitudinal axis. The slot has a pair of opposed and spaced apart slot walls that face one another. The slot extends slightly helically around the cylindrical body between the opposed ends.

In one example, a generally cylindrical center bore is disposed at the longitudinal axis and extends the length of the body. The center bore has a diameter that is larger than a width of the slot between the slot walls.

In one example, the center bore is substantially a circular cylinder. In another embodiment, the center bore has a diameter of less than about one fourth a diameter of the body.

In one example, the protective device has at least one projection protruding from each of the slot walls. Each projection protrudes from a respective one of the slot walls and generally toward the other of the slot walls.

In one example, the elongate body is generally a circular cylinder. In another example, the body is fabricated from an ultraviolet protected silicone rubber material. In a further example, the protective device is extruded from an ultraviolet protected silicone rubber material. In a still further example, the body is generally linear when not installed on the edge of the glass object.

In one example, the protective device has at least one projection protruding from each of the slot walls and generally toward the other of the slot walls. The projections each comprise a continuous rib extending over the entire length of the slot.

In one example, the protective device further has a plurality of the projections formed on each of the slot walls. In another example, the projections further comprise at least two generally parallel and spaced apart continuous ribs formed on each of the slot walls and extending over a substantial portion of a length of the slot.

In one example, the projections each further comprise a plurality of spaced apart discrete protrusions arranged linearly along each of the slot walls over a substantial portion of a length of the slot.

In one example, each of the projections has a generally semi-spherical shape in cross section.

In one example, the protective device is received over a partially lowered vehicle window.

In another example according to the teachings of the present invention, a protective device for placement on an edge of a partially lowered vehicle window includes a relatively flexible elongate body. The body has an exterior circular cylindrical surface terminating at a pair of opposed ends, a longitudinal axis, an exterior surface diameter, and a length between the opposed ends in a direction of the longitudinal axis. The device has a slot formed in the body for receiving the window edge. The slot extends between the opposed ends in the direction of the longitudinal axis. The slot has a pair of opposed slot walls facing one another and spaced apart about one-sixteenth of an inch or less. The slot extends slightly helically around the cylindrical body between the opposed ends.

These and other objects, features, and advantages of the present invention will become apparent upon a review of the detailed description and accompanying drawings. Though particular examples according to the teachings of the present invention are disclosed, the invention is not to be so limited. Changes and modifications can be made to the examples disclosed herein and yet fall within the scope and spirit of the present invention.

BRIEF DESCRIPTION OF THE DRAWINGS

Several examples of the present invention are disclosed in the drawing figures. Like reference numerals represent like parts in the various examples and, in which:

FIG. 2 illustrates a cross-section taken along line II—II of the device of FIG. 1 prior to being installed on the vehicle window edge;

FIG. 3 illustrates the cross-section of the device of FIG. 2 after installation on the vehicle window edge;

FIG. 4 is a plan view of the protective device shown in FIG. 1 and showing the helical slot formation;

FIGS. 5A and 5B illustrate the opposite ends of the device shown in FIG. 4;

FIG. 6 illustrates a cross-section similar to that shown in FIG. 2, but of another example of a protective device constructed according to the teachings of the present invention and prior to being installed on the vehicle window edge;

FIG. 7 illustrates the cross-section of the device of FIG. 6 after installation on the vehicle window edge;

FIG. 8 illustrates a cross section of another example of a protective device constructed according to the teachings of the present invention;

FIG. 9 illustrates a cross-section of another example of a protective device constructed according to the teachings of the present invention;

DETAILED DESCRIPTION OF THE PREFERRED EMBODIMENTS

A protective device constructed according to the teachings of the present invention is formed from a relatively soft and flexible material and is to be installed on an edge of a vehicle window or other glass object in order to provide a cushion to prevent injury to animals, children, and adults that abruptly contact the edge of the glass. The device is generally a one-piece, unitary, integral structure that is installed over the edge of the vehicle window or glass object and that remains installed by virtue of surface friction between the window and the device as well as material tension created by a slight twisting of the device.

Figure 1:
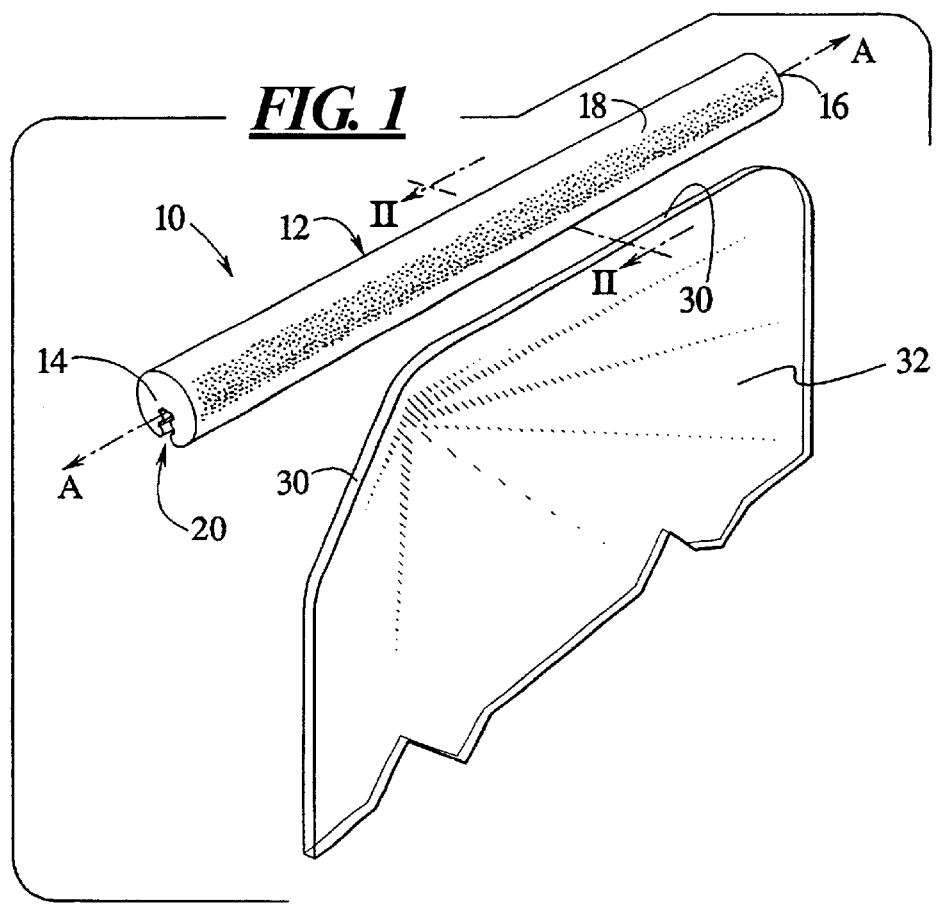
FIG. 1 illustrates a perspective view of a protective device constructed according to one example of the teachings of the present invention, the device being positioned adjacent to a vehicle window edge.

Referring now to the drawings, FIG. 1 illustrates a protective device 10 constructed in accordance with the teachings of the present invention. The device 10 generally includes an elongate body 12 with a pair of opposite ends 14 and 16. The elongate body also has an exterior surface 18 extending between the ends 14 and 16. The elongate body 12 includes a longitudinal axis A extending the length of the body.

A window receiving slot 20 is formed in the elongate body 12 and extends generally in the direction of the longitudinal axis A. The slot 20 is formed into the body material via the exterior surface 18. The slot 20 has a depth defined by an end surface 21 of the slot. The slot 20 also has a width defined by a pair of opposed sidewalls 22 and 24 that extend the length of the slot. In the example shown in FIGS. 1–3, the opposed sidewalls 22 and 24 are generally linear or planar in nature and generally face one another. Also in the example of FIGS. 1–3, the sidewalls 22 and 24 arranged generally parallel to one another.

As illustrated in FIGS. 1–3, to install the device 10, the slot 20 is placed over the top edge 30 of a vehicle window 32 or other glass object. The protective device 10 is illustrated in FIG. 2 just prior to installation on the glass window 32. FIG. 3 illustrates the same cross-section after installation of the device 10 on the window 32. The slot width between the sidewalls 22 and 24 can be slightly wider than the width of the window 32, can be essentially the same as the width of the window, or can be slightly narrower that the width of the window. The narrower the slot, the more surface friction between the window and the device. Surface friction can be utilized to assist in retaining the device on the window edge.

FIGS. 4, 5A, and 5B illustrate another aspect according to the teachings of the present invention that assists in holding the device on the window edge. FIG. 4 shows a plan view of the device 10 and the slot 20. FIGS. 5A and 5B illustrate identically oriented views of the opposed ends 14 and 16 of the device. The slot 20 does not extend linearly parallel to the longitudinal axis A. Instead, the slot 20 is slightly helically curved around the body 12. In one example, the slot 20 curves helically around the body 12, determined by the angle α from a slot starting position "S" at one end of the device as shown in FIGS. 5A and 5B, between about 5° to 30° from one end 14 to the opposite end 16. This helical angle α can vary for a given device design or for a particular need as desired. The angle is preferably at least about 3° and less than about 45° to provide adequate grip and yet prevent deformation of the device when installed.

With the helical slot 20, the device 10 must twist slightly when installed on a generally planar glass object. The slight twist in the protective device 10 increases pressure applied by the slot walls 22 and 24 against the window surfaces. Thus, the helical slot helps to increase surface friction to assist in holding the device 10 in place. The device 10 as shown in FIGS. 1–3 can alternatively include a linear slot.

FIGS. 6 and 7 illustrate another example of the device 10 according to the teachings of the present invention. In this example, the side walls 22 and 24 of the slot 20 are not flat or planar. Instead, a plurality of projections 26 are provided with at least one projection formed on each of the sidewalls 22 and 24 of the slot 20. Each projection 26 protrudes from a respective one of the sidewalls generally toward the other of the sidewalls and therefore into the slot. The projections 26 define a narrower slot width between an end 28 of each projection 26 and the opposed projection or the portion of the opposite sidewall facing the, projection. As shown in FIG. 2, each sidewall 22 and 24 of the slot 20 includes a pair of spaced apart projections 26 facing the opposed sidewall. Each sidewall can include only one projection or no projection, if desired.

As illustrated in FIGS. 6 and 7, to install the device 10, the slot 20 is placed over the top edge 30 of a vehicle window 32 or other glass object. The protective device 10 is illustrated in FIG. 6 just prior to installation on the glass window 32. FIG. 7 illustrates the same cross-section after installation of the device 10 on the window 32. The slot width between the sidewalls 22 and 24 can be slightly wider than the width of the window 32 in this example. The width within the slot 20 between the ends 28 of the directly opposed projections 26 is less than the width of the window 32. Upon installation, the projections 26 deform or compress and thus apply pressure to the window via the resiliency of the material exerting a gripping or clamping force to help retain the device 10 on the window. As described above, surface friction between the glass window 32 and the ends 28 of the projections 26 will also assist in retaining the device 10 installed on the window, as will the helical form of the slot 20. Material selection can be utilized to produce a device 10 that enhances the compression characteristics of the projections and the surface friction characteristics relative to the surface of the glass 32.

Although each projection 26 illustrated in FIGS. 6 and 7 on one of the sidewalls such as sidewall 22 has a mirror image and directly opposing projection 26 on the opposite sidewall such as the sidewall 24, this arrangement is not necessary. Each projection 26 can alternatively directly oppose a portion of the opposite sidewall that does not include a projection so that each projection may be positioned between or adjacent one or more projections on the opposite sidewall. In either embodiment, the opposing projections 26 reduce the distance between the ends 28 of the projections 26. The projections 26 are illustrated as having a semi-spherical cross section shape. The shape is suitable for installing, gripping and removing as desired for the device. However, the shape of the projections can vary considerably within the scope of the invention.

Instead of the sidewalls 22 and 24 being formed generally parallel to one another as shown in FIGS. 2–7, they can be formed with a slight taper. FIG. 8 illustrates an alternative example of the device 10 wherein the slot 20 includes a pair of sidewalls 40 and 42 that are also generally planar or linear but are not arranged parallel to one another. In this example, the sidewalls 40 and 42 taper away from one another moving from a bottom or end surface 21 of the slot 20 toward the opening of the slot. Such a construction, depending upon the material selection for producing the elongate body 12 of the device 10, may be preferred to improve the manufacturing and cooling process of the device.

FIG. 9 illustrates another example of the device 10 wherein the slot 20 includes only a single projection 26 formed on each of the sidewalls 22 and 24 within the slot 20. As will be evident to those skilled in the art, the number of projections 26 on each of the sidewalls and the relative positioning of the projections on one sidewall relative to those on the other sidewall can vary considerably and still remain within the scope of the present invention. In a further example, one side wall can have a projection and the other side wall being flat or planar as in FIGS. 2 and 3.

Figure 10:
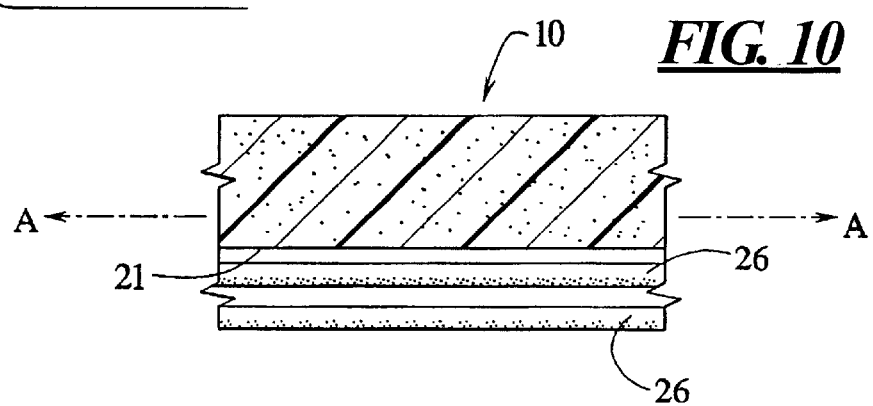
FIG. 10 illustrates a longitudinal cross-section taken along the line X—X of the device of FIG. 6.

FIG. 10 illustrates a longitudinal cross-section along the axis A of the elongate body 12 as shown in FIG. 6. As can be seen in FIG. 10, in one example, the projections 26 can be continuous elongate ribs that extend along a substantial portion of the length of the slot 20. In one example, the ribs extend completely over the entire length of the slot and terminate at the ends 14 and 16 of the elongate body 12.

Figure 11:
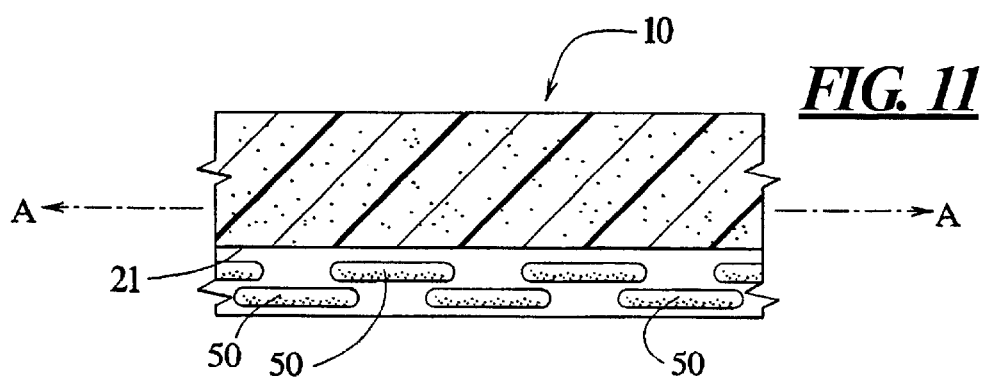
FIG. 11 illustrates a longitudinal cross-section of another example of a protective device constructed according to the teachings of the present invention.

FIG. 11 illustrates another alternative example wherein the projections are not continuous ribs, but instead are a plurality of bumps 50 arranged along each of the sidewalls 22 and 24 of the slot 20. In the example illustrated in FIG. 11, the bumps or discrete projections 26 each have a finite length and are arranged in a generally linear pattern along the length of the slot 20. It is also within the scope of the present invention to arrange the bumps or discrete projections 26 randomly both in a longitudinal direction and in a vertical direction over the sidewalls 22 and 24.

Referring back to FIGS. 5A and 5B, another alternative feature according to the teachings of the present invention is illustrated. The elongate body 12 in this embodiment includes the longitudinal slot 20 extending along the length of the body. The slot includes the pair of closely spaced and opposed side walls 22 and 24, and the slot is preferably slightly helical around the elongate body 12 as discussed above. The depth of the slot 20 terminates at a cylindrical center bore 56 that also extends longitudinally along the center axis and over the length of the body 12. In one example, the center bore 56 is nearly circular and has a substantially continuous interior surface that terminates only at the closely spaced side walls of the slot. The center bore 56 in one example has a diameter that can be about one fourth or less than the diameter of the exterior surface 18 of the body 12. The center bore diameter can also be larger than the width of the slot 20, and in this example is much larger. The slot 20 shown in FIGS. 5A and 5B is about one sixteenth of an inch wide and the bore diameter is about one quarter inch.

The center bore 56 in this example assists the slot walls 22 and 24 in spreading apart when installing the device on a glass object such as a window edge. The center bore 56 permits the walls to spread apart and yet remain more parallel to one another. Once the device 10 is installed, the center bore 56 also assists the side walls in applying more evenly distributed pressure against the glass object over the surface area of the slot and slot walls because the walls are more parallel to one another.

Figure 12:
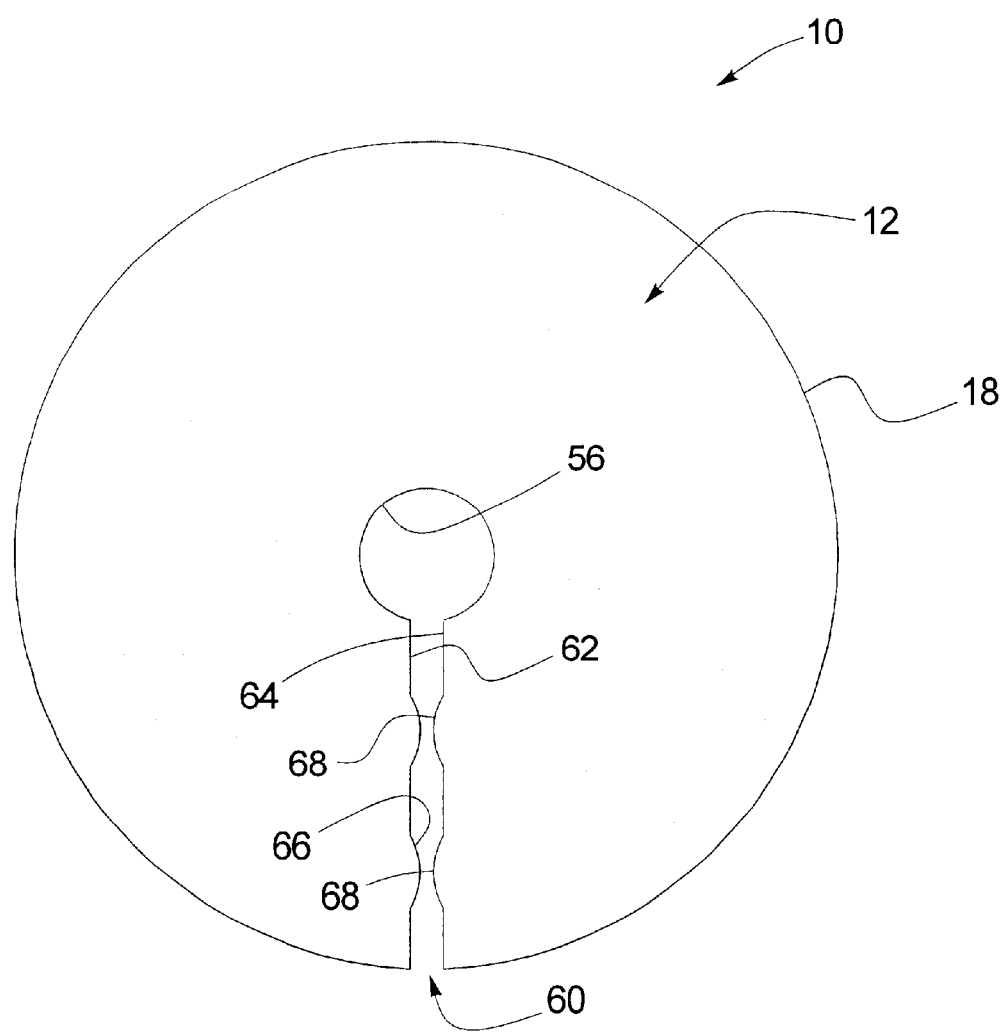
FIG. 12 illustrates a cross-section of another example of a protective device constructed according to the teachings of the present invention.

FIG. 12 illustrates another alternative example of a device 10 that includes the center bore 56 as describe above. This device 10 has a slot 60 with a pair of opposed and generally parallel side walls 62 and 64. Each side wall is shown having a pair of spaced apart protrusions 66 and 68, respectively. The protrusions are arranged so that each protrusion on each side wall directly opposes and confronts a corresponding protrusion on the opposite side wall. As will be evident to those skilled in the art, each side wall 62 and 64 can include only protrusion or can include more than two protrusions, as discussed above for the earlier described embodiments. The protrusions can also be arranged as shown or can be arranged offset relative to one another across the gap between the sidewalls, also as described previously. The protrusions 66 and 68 can also be segmented or continuous ribs arranged either linearly or randomly over the sidewall surfaces. The slot in this example can be either linear or extend slightly helically around the body 12.

In one example, the elongate body 12 of the device 10 is extruded as a continuous length product and then trimmed or cut to length forming the ends 14 and 16. In some of the above-described examples, the extrusion die can be formed to provide the slot and the side wall configurations in the extruded part within the die. In other examples, such as the flat or planar wall examples, a knife or trim blade can be placed at the exit from the extrusion die to cut or form the slot. The twist or helical slot formation in some of the above examples can be provided by twisting the extruded product as it exits the die, or can be provided simply by the manner that the extruded material is cooled, depending upon the part configuration and material. A simple method of manufacturing the device 10 having a slightly helical slot is to place a cutting blade at the exit of the die. The slot is cut immediately after the extruded material exits the die. As the parts cool, depending upon material characteristics, the slot will twist slightly.

In one example, a preferred material is ultraviolet protected silicon rubber that is extruded as a continuous length body and then cut into discrete length parts. When the elongate body 12 is formed by extrusion, it will be evident to those skilled in the art that the most preferred and simple construction of the projections 26, if present, is to form them as continuous ribs extending the entire length of the slot so that the extrusion process and the extrusion mold and tooling construction is most simple. This material is also well suited for the flat slot wall, helically twisted examples described herein.

It will be evident to those skilled in the art that other materials can be utilized to produce the protective devices 10 of the invention. It is preferred that the elongate body 12 is flexible so that the device can conform to a curvature of a top edge of a window or edge of another glass object when installed. In one example, the elongate body 12 is extruded forming a generally linear protective device 10 when the device is at rest and uninstalled. Because of the flexible nature of the selected material, the device can be bent to accommodate a curved top edge of a vehicle glass window. In an alternative example, the elongate body 12 can be formed having a curved contour when the device is at rest. Again, the curve can be added to the die or by the manner in which the parts are cooled. However, such an embodiment would require the process and/or the material necessary for forming the protective device 10, and possibly the tooling for manufacturing such a device, to be more elaborate and thus more expensive.

Changes and modifications can be made to the protective device 10 as described herein with departing from the spirit and scope of the present invention. Such changes and modifications are intended to fall within the scope of the invention. The invention is therefore to be limited only by the scope of the appended claims.

I claim as my invention:

1. A protective device for placement on an edge of a glass object, the protective device comprising:
    a relatively flexible elongate cylindrical body having an exterior surface terminating at a pair of opposed ends, a longitudinal axis, and a length between the opposed ends in a direction of the longitudinal axis; and
    a glass object receiving slot formed in the body and extending substantially between the opposed ends in the direction of the longitudinal axis, the slot having a pair of opposed and spaced apart slot walls facing one another, wherein the slot extends slightly helically around the elongate body between the opposed ends.

2. The protective device according to claim 1, wherein the slot curves around a circumference of the elongate body less than about 10° from one of the opposed ends to the other of the opposed ends.

3. The protective device according to claim 1, further comprising:
    a generally cylindrical center bore disposed at the longitudinal axis and extending the length of the body, wherein the center bore has a diameter that is larger than a width of the slot between the slot walls.

4. The protective device according to claim 1, further comprising:
    at least one projection protruding from each of the slot walls, each projection protruding from a respective one of the slot walls and generally toward the other of the slot walls.

5. The protective device according to claim 1, wherein the center bore is substantially a circular cylinder.

6. The protective device according to claim 1, wherein the center bore has a diameter of less than about one fourth a diameter of the body.

7. The protective device according to claim 1, wherein the elongate body is generally a circular cylinder.

8. The protective device according to claim 1, wherein the body is fabricated from an ultraviolet protected silicone rubber material.

9. The protective device according to claim 1, wherein the protective device is extruded from an ultraviolet protected silicone rubber material.

10. The protective device according to claim 1, wherein the body is generally linear when not installed on the edge of the glass object.

11. The protective device according to claim 1, further comprising:
    at least one projection protruding from each of the slot walls and generally toward the other of the slot walls, wherein the projections each comprise a continuous rib extending over the entire length of the slot.

12. The protective device according to claim 11, further comprising a plurality of the projections formed on each of the slot walls.

13. The protective device according to claim 11, wherein the projections further comprise at least two generally parallel and spaced apart continuous ribs formed on each of the slot walls and extending over a substantial portion of a length of the slot.

14. The protective device according to claim 11, wherein the projections each further comprise a plurality of spaced apart discrete protrusions arranged linearly along each of the slot walls over a substantial portion of a length of the slot.

15. The protective device according to claim 11, wherein each of the projections has a generally semi-spherical shape in cross section.

16. The protective device according to claim 1, wherein the glass object is a vehicle window.

17. A protective device for placement on an edge of a partially lowered vehicle window, the protective device comprising:
    a relatively flexible elongate body having an exterior cylindrical surface terminating at a pair of opposed ends, a longitudinal axis, an exterior surface diameter, and a length between the opposed ends in a direction of the longitudinal axis; and a slot formed in the body for receiving the window edge, the slot extending between the opposed ends in the direction of the longitudinal axis, the slot having a pair of opposed slot walls facing one another and spaced apart about one-sixteenth of an inch or less, and wherein the slot extends slightly helically around the elongate body between the opposed ends.

18. The protective device according to claim 17, wherein the slot curves around a circumference of the elongate body less than about 10° from one of the opposed ends to the other of the opposed ends.

19. The protective device according to claim 17, further comprising:

a circular cylindrical bore disposed at the longitudinal axis and extending the length of the body, wherein the center bore has a diameter that is larger than the spacing between the slot walls and less than about one-fourth the diameter of the body exterior surface.

20. In combination, a protective device and a partially lowered vehicle window, the combination comprising:

an edge along a top end of the partially lowered vehicle window;

a flexible elongate body having an exterior circular cylindrical surface, a pair of opposed ends, a longitudinal axis, an exterior surface diameter, and a length between the opposed ends in a direction of the longitudinal axis;

a slot formed in the body and extending between the opposed ends in the direction of the longitudinal axis, the slot having a pair of opposed and spaced apart slot walls facing one another, and the slot extending slightly helically around the elongate body between the opposed ends; and a circular cylindrical bore disposed at the longitudinal axis and extending the length of the body, wherein the center bore has a diameter that is larger than the spacing between the slot walls; and wherein the edge of the vehicle window is received between the sidewalls within the slot, causing the slot to straighten in order to retain the protective device on the vehicle window edge.

\* \* \* \* \*